(12) United States Patent
Thandiwe

(10) Patent No.: US 6,268,713 B1
(45) Date of Patent: Jul. 31, 2001

(54) METHOD FOR LI-ION SAFETY SWITCH FAULT DETECTION IN SMART BATTERIES

(75) Inventor: Iilonga P. Thandiwe, Atlanta, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/258,730

(22) Filed: Feb. 26, 1999

(51) Int. Cl.[7] .................................................. H02J 7/00
(52) U.S. Cl. ........................................................ 320/134
(58) Field of Search ................... 320/132, 134, 320/136; 361/86

(56) References Cited

U.S. PATENT DOCUMENTS

| | | | |
|---|---|---|---|
| 5,703,463 | * 12/1997 | Smith | 320/134 |
| 5,825,155 | * 10/1998 | Ito et al. | 320/118 |
| 5,850,136 | * 12/1998 | Kaneko | 320/122 |
| 5,903,131 | * 5/1999 | Sekine et al. | 320/106 |
| 5,963,019 | * 10/1999 | Cheon | 320/134 |
| 5,986,865 | * 10/1998 | Umeki et al. | 320/134 |
| 5,998,967 | * 2/1999 | Umeki et al. | 320/122 |
| 6,020,722 | * 2/2000 | Freiman | 320/164 |
| 6,031,302 | * 2/2000 | Levesque | 320/132 |
| 6,046,575 | * 4/2000 | Demuro | 320/134 |
| 6,051,954 | * 4/2000 | Nagao et al. | 320/136 |

* cited by examiner

Primary Examiner—Peter S. Wong
Assistant Examiner—Pia Tibbits
(74) Attorney, Agent, or Firm—Philip H. Burrus, IV

(57) ABSTRACT

A method for testing safety circuitry in rechargeable battery packs is provided herein by which the operation and integrity of circuits associated with rechargeable cells may be verified. A controller 103 senses current flow during cell 108 charge or discharge. The controller 103 then activates the safety circuitry and once again senses current to ensure high circuit impedance. If a fault is detected, the controller 103 notifies the user or host device. The controller 103 then decides if the fault warrants isolating the cell 108 from the terminals of the battery pack 111, 112. If such action is warranted, the controller 103 clears the current carrying path 104, 105, creating a fail condition that does not endanger the user or associated equipment.

3 Claims, 2 Drawing Sheets

METHOD FOR LI-ION SAFETY SWITCH FAULT DETECTION IN SMART BATTERIES

TECHNICAL FIELD

This invention relates in general to rechargeable batteries and battery chargers. More specifically, the invention relates to safety circuits associated with rechargeable batteries.

BACKGROUND

Portable devices depend upon batteries as a power source. As the power consumption demands of these electronics devices is continually increasing, so is the need for high capacity batteries with long storage life. Depending upon the chemistry, rechargeable batteries have different characteristics. For example, one of the earliest rechargeable chemistries, Nickel Cadmium (Ni-Cad), is very robust and inexpensive, but has a very poor capacity to weight ratio that results in large bulky batteries. Another later technology, Nickel Metal Hydride (Ni-MH), proved to be smaller, but offered no significant increase in the capacity to weight ratio.

Lithium Ion (Li-Ion) and Lithium Polymer (Li-P) batteries made a substantial leap in energy capacity per unit weight. With the advent of Li-Ion/Li-P cells, batteries became much smaller with greater storage capacities. The downside of Li-Ion/Li-P, however, involves safety. If Li-Ion/Li-P batteries are charged improperly or over charged, they can rapidly release gas at excessive temperatures, which can cause fire or explosion. Therefore, Li-Ion/Li-P battery chargers must precisely regulate the charging of such batteries.

Charging voltage must be precisely controlled in Li-Ion/Li-P battery chargers. Typically external circuitry is placed about Li-Ion/Li-P cells, to prevent failure. When protection circuitry fails, however, Li-Ion/Li-P cells can once again become unstable. There is thus a need for a means for testing safety circuits.

SUMMARY OF THE INVENTION

This invention is a method that is used with safety circuits found in rechargeable battery packs. This method provides a means of testing the safety circuits to ensure integrity.

DETAILED DESCRIPTION OF THE DRAWINGS

Figure 1:
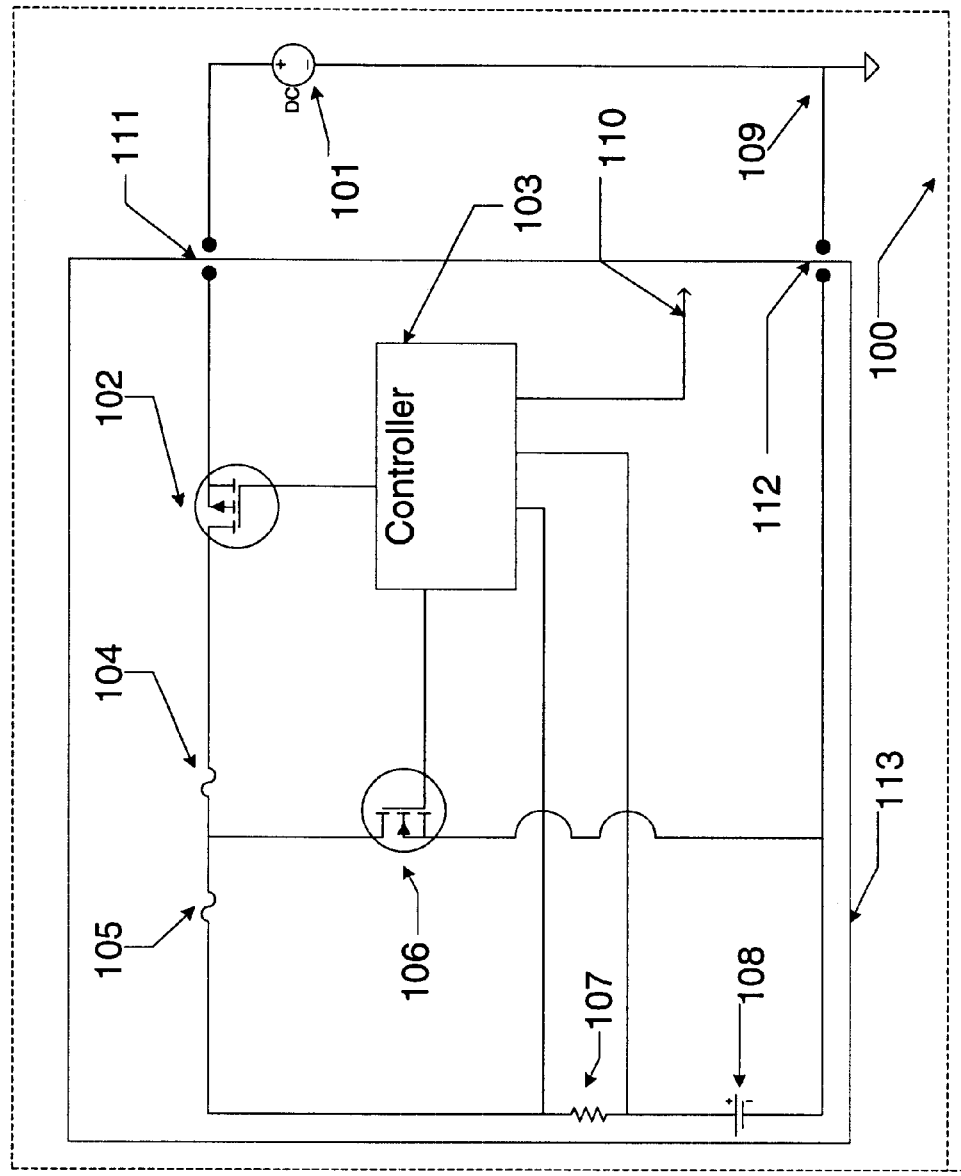
FIG. 1 illustrates a schematic diagram of common safety circuit elements associated with rechargeable battery packs according to the present invention.

While the specification concludes with claims defining the features of the invention that are regarded as novel, it is believed that the invention will be better understood from a consideration of the following description in conjunction with the drawings, in which like reference numbers are carried forward.

Great care must be taken when designing circuits involving lithium storage cells. Charging and discharging must be strictly regulated, especially regarding current and voltage levels. When a lithium cell is charged for too long, or when one is charged with too much energy, the lithium can release combustible gasses at very high temperatures. The end result of improper charging can be fire or explosion, and worse, injury to the user.

Battery cell packs that include lithium cells, therefore, typically include some type of protection circuitry that senses charge and discharge rates, as well as cell voltage and temperature. If any anomaly is detected, e.g. excessively high charge or discharge current levels, high cell voltage levels, high cell temperature, etc., the protection circuitry will open. The open circuit thus isolates the cell from the external battery terminals, protecting people and equipment. Typically, low drain to source resistance transistors are connected in series with the cell as pass elements. These transistors open under fault conditions.

Concern remains, however, as any electrical component can fail. If the protection pass element fails in a short condition, the protection circuit becomes compromised. To overcome the possibility of a single failure, redundant components are typically used to ensure a second level of protection. A redundant component may comprise a second pass transistor, a fuse, and so on.

To provide complete protection, it is desirable to test protection circuits to ensure integrity prior to charging or discharging. This invention provides a method applicable to basic protection circuit topologies, which allows a simple and elegant means of testing the integrity and functionality of lithium battery protection circuits.

A smart battery pack has the ability to send and respond to data and commands from a host device, e.g. a laptop computer or a cellular telephone. The battery typically contains a microcontroller to manage the communication, as well as one or more switching means. The microcontroller may also monitor charge and discharge current through sense resistors. The switching means may also be controlled by secondary circuitry.

The safety switching means in a battery pack, such as a lithium-ion battery pack, are a critical link in the safety circuitry. The output of all detection circuits are eventually routed to, and control these switches. The present invention provides a means for detecting the failure of these switching means. The invention provides three modes in which there is an opportunity to test safety switches in a battery pack and report on their function.

During a fault condition

If a fault condition is detected, e.g., over-voltage or under voltage, the microprocessor will open the switching means (for example field effect transistors, bipolar junctions, vacuum tubes, relay) and subsequently measure the current flowing through the resistors. If after issuing a signal to open the switches, the microprocessor continues to measure current flow into or out of the battery, the microprocessor will inform the host that at least one level of safety protection in the battery is inactive. In one embodiment of the invention, the microcontroller may activate an additional circuit to permanently disable the battery pack.

Testing during charging

At the beginning of each charge cycle a charge control switching means is tested. The safety circuitry is always enabled. To test the switches during charging the following method is used. At the onset of charging the current and voltage are measured by the battery to determine if they are at an acceptable level for testing. If not, charging continues, otherwise the battery informs the charger that testing of the switching means (i.e. a FET) will begin. Once the charger acknowledges the start of the test the battery opens the switching means, and then measures the current. If the current is zero, the switching means is closed, and the charger is informed that the test is complete, and charging continues. If after opening the switching means the current measured by the battery does not equal zero, the charger is informed that the test has failed and that charging should be terminated. A permanent failure bit may then be set in the memory associated with a microcontroller and a battery means, and the failure may be communicated to the host device. If desired, the microcontroller may activate an additional circuit to permanently disable the battery pack.

Test during discharge

To test the switches during discharge the following method is used. The discharge switching means are tested just prior to the system powering down. The battery pack requests from the host that a discharge switching means test be conducted at "power down". The battery pack makes such a request at a preset number of cycles. The host waits until a power down signal is initiated by the user. The host then goes through its usual power down routines. At the completion of these tasks the host will inform the battery that the discharge switching means test can begin. The battery measures the current to verify that it is at a measurable level, and then opens the discharge switching means. If the current drops to zero, the test is successful, and the switching means is closed. If the current does not drop to zero, a permanent failure bit may be set in the microcontroller, and the failure may be communicated to the host. The host may then notify the user of the failure, and deactivate the entire system. If desired, the microcontroller may activate an additional circuit to permanently disable the battery pack Referring now to FIG. 1, there is illustrated therein elements commonly found in lithium battery pack charging circuits. A battery charging system 100 is shown with a power source 101 and battery pack 113. The battery pack 113 includes one or more rechargeable battery cells 108. The power source 101 and battery pack 113 interface through at least two terminals 111,112, and have a common return point 109.

The other components comprise the protection elements associated with the cell 108. The control of the protection circuitry is generally provided by either digital or analog control means, which is illustrated here in general terms as the controller 103. The primary protection element is the pass transistor 102 through which current flows during charging or discharging. The pass transistor 102 is a short under normal conditions and may be opened by the controller 103 during fault conditions. When the pass transistor 102 is opened, the terminals 111,112 of the battery pack 113 become electrically isolated from the cell 108, ensuring a safe fail condition.

A second stage of protection is provided by the fuses 104,105 and the fuse control transistor 106. Under normal conditions, the fuse control transistor 106 is open and current flows through the fuses 105,106 in order to charge or discharge the cell 108. There are two modes of clearing the fuses 104,105 under fault conditions. First, if the level of current flowing in the fuses 104,105 becomes greater than rated capacity, one or both of the fuses 104,105 will clear, causing the terminals 111,112 of the battery pack 113 to be electrically isolated from the cell 108. Second, if the controller 103 detects a fault condition, it will close the fuse control switch 106, shorting both the cell 108 and power source 101 to ground through fuse 105 and fuse 104 respectively. If there is enough energy in either the cell 108 or the power source 101, shorting to ground will cause either or both fuses 104,105 to clear. Again the terminals 111,112 of the battery pack 113 will be isolated from the cell 108.

A resistor 107 for sensing current is shown by which the controller 103 may detect the current flowing during charge and discharge. This is accomplished easily by sensing the voltage across the current sense resistor 107 and then dividing by its impedance.

The components shown in FIG. 1 offer at least two levels of protection. The first level is the pass transistor 102 which may be opened by the controller 103, and the second is the fuse 104,105 and fuse control transistor 106. It is apparent that more levels of protection may be easily added by inserting redundant components. For example, adding a second pass element would add a reserve component for use in the case where the pass transistor fails 102 as a short. It is well to note that when series components fail in an open mode, a safe fail condition exists, as the cell 108 is electrically isolated from the battery terminals 111,112.

When fault conditions arise, it is often desirable to notify either the user or the host device that a fault has occurred. This is convenient, because closing the fuse control switch 106 renders the battery pack 113 inoperable. As the means of notification could be visual, audio, digital, etc., the diagram has illustrated a connection to an identification means 110. The controller 103 may also record the fault occurrence in its memory for future reference.

Figure 2:
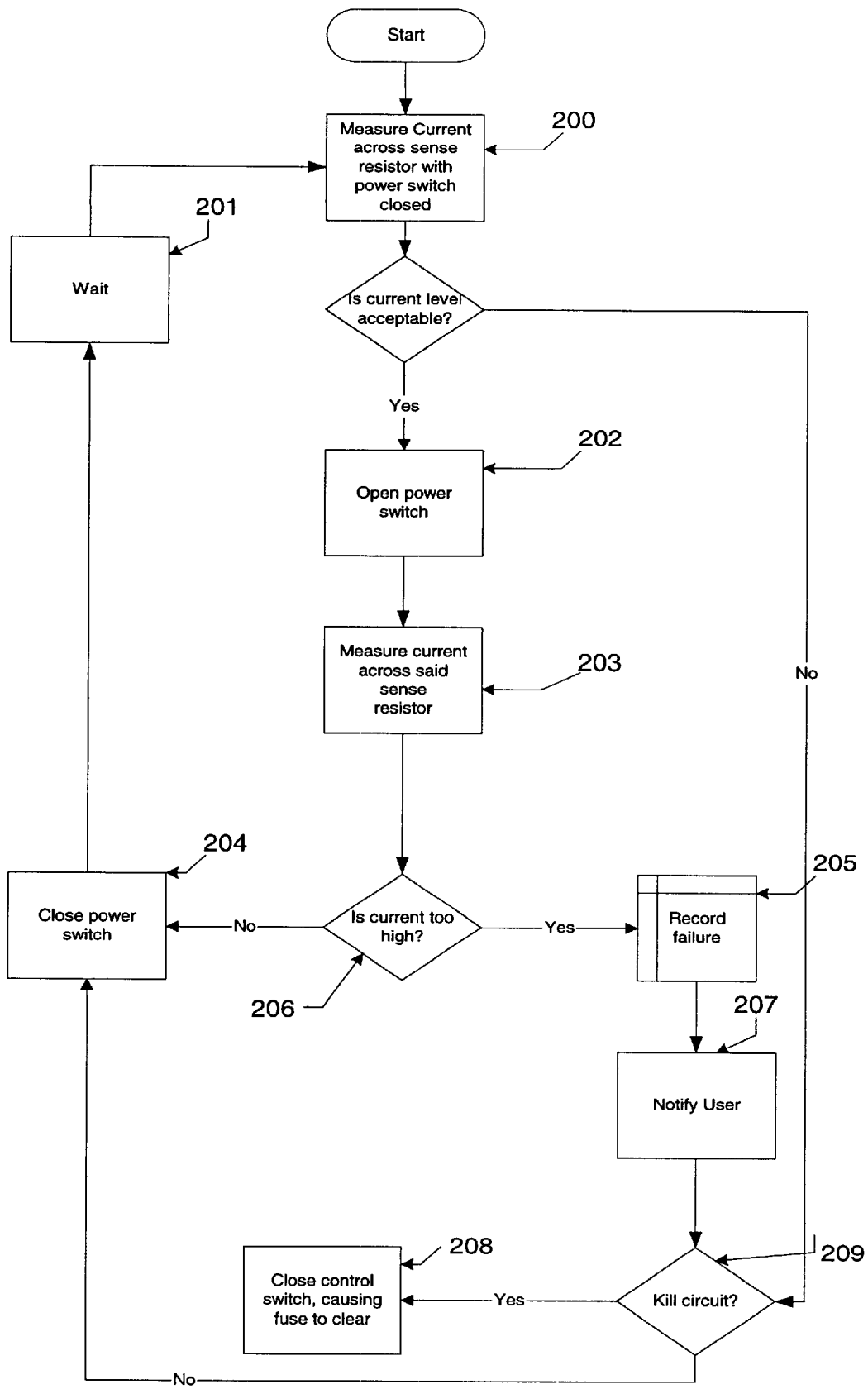
FIG. 2, is a flow chart that illustrates the steps of the method described herein.

Referring now to FIG. 2 illustrated herein is a flow chart of the algorithm used with the protection circuitry in accordance with the invention. The algorithm will be recited here in text form, referring to FIG. 1, so specific components can be associated with the steps in the algorithm. The following description parallels the flow chart illustrated in FIG. 2.

At the beginning of a charge or discharge cycle, the pass element 102 is closed, which allows current to flow from the terminals 111,112 of the battery pack 113 to the cell 108. As the charge or discharge begins, the controller 103 measures the current in the sense resistor 107 to ensure that current is flowing at an appropriate level. If a fault condition is detected, the controller 103 may immediately isolate the cell 108 from the terminals 111,112 of the battery pack 113 by closing the fuse control switch 106 and clearing the either or both fuses 104,105.

Providing that the circuit is working properly, and the current is at a measurable level, the controller 103 then opens the pass transistor 102, thereby stopping the flow of current. Once the pass transistor 102 is open, the controller 103 then senses the current in the sense resistor 107, which should now be near zero. If the current is in fact near zero, the controller 103 may conclude that opening the pass transistor 102 has in fact stopped the flow of current. The pass transistor 102 is therefore serving its role as a protection device. The controller 103 then closes the pass transistor 102 and allows charging or discharging to continue.

If however, at this point, current flow is detected in the sense resistor 107, the controller 103 may conclude that the pass transistor 102 has failed and is unable to stop the flow of current. The controller 103 then records a failure and sends notification to the user through the notification terminal 110. The controller 103 then makes the decision whether or not the fault requires termination of battery pack 113 operation. If the controller 103 determines that cell isolation 108 is required, the controller 103 simply closes the fuse control switch 106, causing either or both fuses 104,105 to clear, thus creating electrical isolation between the battery terminals 111,112 and the cell 108.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of testing safety circuits in battery charging systems, comprising:
   a) providing a power source with a return line for supplying or dissipating energy;
   b) providing a battery pack with one or more cells for storing or supplying energy;
   c) providing a fuse means connected in series between said power supply and said cell(s);
   d) providing a control switch whereby the switch, when closed, shorts either the power supply or cell(s) to ground through said fuse means;
   e) providing one or more power switches connected in series between said power supply and said cell(s);
   f) providing a series resistor for sensing current;
   g) providing an indicating means;
   h) providing a controller with memory which will, at either the onset of charging or the onset of discharging, verify the integrity of the protection circuit with these steps:
      1) measure the sense voltage across said sense resistor with said power switch closed;
      2) open said power switch;
      3) measure the voltage across said sense resistor again;
   whereby, when the sense voltage described is above a predetermined limit, the controller will record an error in said memory, notify the user through said indicating means, and when desired, close said control switch clearing said fuse and thus disabling said battery pack, and
   whereby, when the sense voltage is below a predetermined limit, the controller will close said power switch.

2. A method of testing safety circuits in battery charging systems as described in claim 1, further comprising steps of:
   1) Measure the voltage across said sense resistor with said power switch closed;
   2) If the voltage across said sense resistor is above a predetermined limit, proceed to step 8. Otherwise, proceed to step 3;
   3) Open said power switch;
   4) Measure the voltage across said sense resistor with said power switch open;
   5) If the voltage across said sense resistor is above a predetermined limit, proceed to step 8. Otherwise, proceed to step 6;
   6) Close said power switch;
   7) Wait for next charge or discharge cycle to begin. Once the next charge or discharge cycle has begun, proceed to step 1;
   8) Record failure in said controller memory;
   9) Notify user with said indicating means;
   10) Determine whether or not to disable circuit. If circuit disable is required, proceed to step 11. Otherwise proceed to step 6;
   11) Close said control switch, causing said fuse means to clear. Circuit is now disabled.

3. A method of testing safety circuits in battery charging systems comprising the steps of:
   1) A controller with memory activating the safety circuits;
   2) Said controller deactivating said safety circuits prior to the onset of charging or discharging;
   3) Said controller reactivating said safety circuits;
   4) Said controller comparing parameters associated with said safety circuits in steps 2 and 3;
   Whereby when said parameters associated with steps 2 and 3 are adequately different, said controller determines said safety circuits are functioning properly;
   Further whereby when said parameters associated with steps 2 and 3 are not adequately different, said controller notifies the user and then terminates circuit operation.

* * * * *